July 27, 1937.  L. W. HELLER  2,087,972
FURNACE
Filed April 25, 1931  2 Sheets-Sheet 2
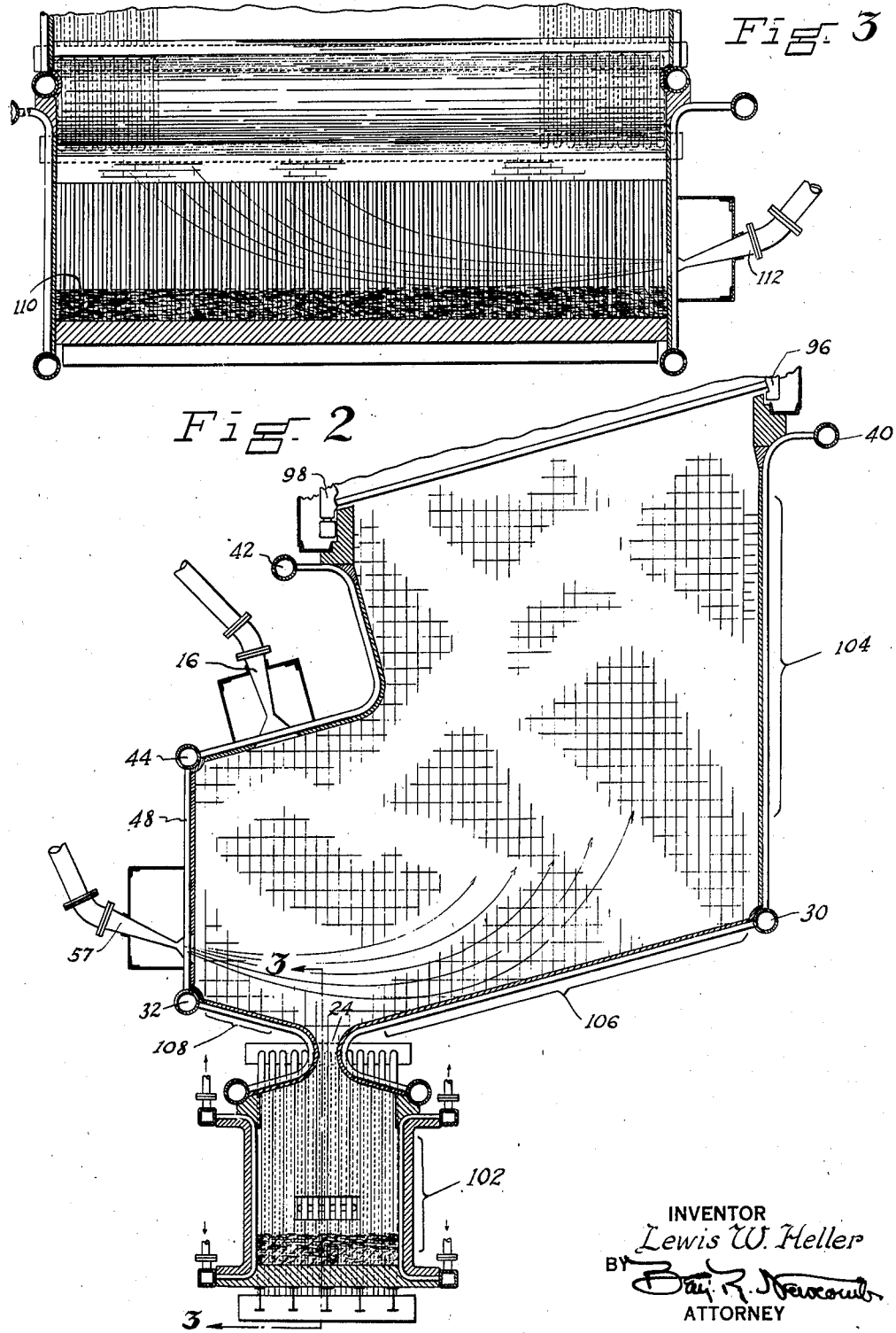
INVENTOR
Lewis W. Heller
BY
ATTORNEY Patented July 27, 1937

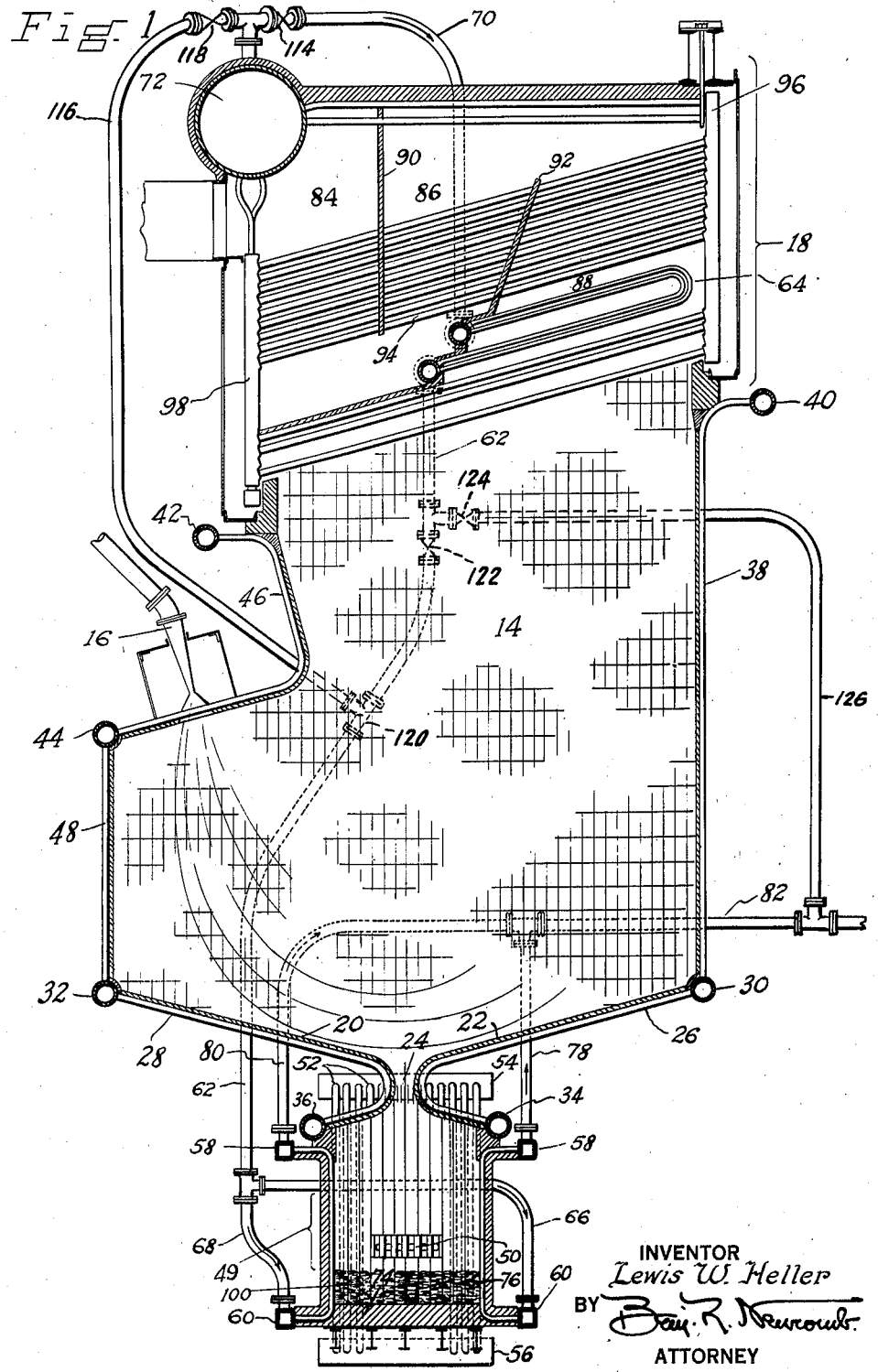

2,087,972

UNITED STATES PATENT OFFICE 2,087,972

FURNACE

Lewis W. Heller, Oak Harbor, Ohio, assignor to The Babcock & Wilcox Company, Bayonne, N. J., a corporation of New Jersey

REISSUED JAN 23 1940

Application April 25, 1931, Serial No. 532,768

15 Claims. (Cl. 122—235)

This invention is concerned with improvements in combustion engineering, and is more particularly related to improvements in furnaces.

It is an object of the invention to provide means whereby a furnace may be operated under widely different combustion characteristics. More specifically, the invention contemplates means for enabling the furnace to operate with a great deficiency of air, such deficiency being created as indicated therein.

In modern steam generating plants it has been the practice to use boiler furnaces fired by powdered fuel burners. In such installations, the combustion chambers have been so large that it has been difficult to take care of the slag formed on the furnace walls. This slag collects on the walls and runs down to the bottom of the furnace. Periodical removal of this collected slag has involved difficulties incident to the freezing of a part of the slag and to the extensive opening made in tapping the furnace. It is an object of this invention to overcome such difficulties.

The provision of a small discharge opening for the tapping of the slag promotes satisfactory furnace operation. The concentration of slag movement attendant upon the provision of such a discharge opening also advantageously affects the operation of apparatus which keeps the slag in a molten condition so that its flow from the furnace will be uninterrupted. Instead of being spread out over a wide area the slag flows toward an opening at one position in the furnace. The slag movement may therefore be said to be concentrated at that position. It is an object of the invention to provide such apparatus.

Another object is to provide a boiler furnace in which the slag does not collect so as to interrupt the operation of the furnace.

It is also an object of the invention to provide an auxiliary or separate furnace operated independently of the main boiler furnace.

A still further object is to provide an arrangement of steam superheaters including a radiant type superheater operating independently of the main boiler furnace.

Further objects of the invention will appear as the accompanying description proceeds.

The invention is described with reference to the accompanying drawings, in which:

Fig. 1 is mainly a vertical section through the illustrative furnace.

Fig. 2 is a vertical section through the illustrative furnace in which the auxiliary furnace may operate with a great deficiency of air without having corresponding effect upon the exhaust gases from the entire furnace construction.

Fig. 3 is a vertical section taken on the line 3—3 of Fig. 2 and at right angles to the plane of Fig. 2.

The illustrative furnace includes a combustion chamber 14 into which the burner 16 leads. Fuels projected into the furnace through the burner are capable of having fluid current movements. Such fuels include powdered coal in addition to fluid petroleum fuels and gaseous fuels. Above the furnace is located a boiler generally indicated by the numeral 18.

The furnace is formed with a water cooled bottom having sloping walls 20 and 22. The sloping walls 20 and 22 are preferably inclined downwardly at an angle less than 45 degrees to the horizontal. Molten slag flowing along these walls flows out of the chamber through an outlet 24 preferably located centrally of the furnace bottom and defined by water cooled walls, the gradual inclination of the walls 20 and 22 preventing cascading of the slag through the outlet 24, and insuring a steady and gradual flow of the molten slag along the sloping walls 20 and 22 and through the outlet 24. Overheating of the bottom of the furnace is prevented by the flow of water through the tubes 26 and 28 which are preferably aligned to outline the sloping portions of the furnace bottom. These tubes lead from lower headers 34 and 36 to upper headers 30 and 32. Water wall tubes 38 connect the header 40 with the lower header 30 on one side of the furnace, and on the other side of the furnace a like construction includes headers 42 and 44 with connected tubing 46 and 48.

When slag forming fuels are burned in the furnace 14, a thin layer of slag is frozen to the walls of the outlet 24 by reason of the water tube construction. There is thus formed a slag cover to protect the walls of the outlet against excessive heat effects. Accumulation of such a slag covering to an undesirable extent is prevented by the flue gases proceeding from the auxiliary furnace 49.

The auxiliary furnace forms a slag pit or chamber located below the slag outlet 24. This chamber is heated by an auxiliary burner 50 preferably projecting burning fuel between upright water wall tubes 52. These tubes lead from an upper header 54 to a lower header 56.

The operative independence of the main and auxiliary furnaces permits successful fulfillment of requirements under widely varying demands. Combustion in the main furnace may be continued after the auxiliary burner is shut off, and the rate of combustion may be varied in the furnace with no effect on the operative condition of the auxiliary furnace. Regulation and change of the output of the apparatus is effected by regulation or control of either or both furnaces.

The illustrative combination permits combustion to be carried on under widely different combustion characteristics. For example, when the auxiliary furnace is operated with an excessive air deficiency, this condition is rectified by mixing of the furnace gases from the auxiliary furnace with the combustion gases and materials in the main furnace projected across the outlet 24 which forms the flue leading from the auxiliary furnace. Such thorough mixing of the gases to promote complete combustion is promoted by an arrangement of burners such as that shown in Fig. 2 of the drawings, the lower burner 57 projecting combustion materials in currents across the auxiliary furnace flue 24. These currents in conjunction with the combustion currents set up by the burner 16 create such a turbulence that there is adequate compensation for conditions which do not cause complete combustion in the auxiliary furnace itself.

When operating as a radiant superheater the desired degree of superheat may be attained irrespective of variation in the operation of the main furnace.

Adjacent the sides of the slag pit are located the headers 58 and 60 of a fluid heat exchange structure herein shown as a radiantly heated steam superheater supplied with steam from the boiler through the inlet 62. As herein shown, the inlet 62 leads from a convection superheater 64 through branches 66 and 68 to the lower header 60 of the radiant superheater. The convection type superheater receives its steam from a drum outlet line 70 leading from the steam and water drum 72.

With the arrangement shown, the slag outlet 24 forms a flue for the auxiliary furnace formed by the slag pit and its burner. This flue permits the products of combustion from the auxiliary furnace to pass directly into the combustion chamber of the main boiler furnace 14. These products of combustion operate to control slag chilling on the walls of the outlet or flue 24.

The slag accumulating on the floor 74 of the auxiliary furnace may drain through the tap 76.

The projection of the combustion currents from the burner 50 towards the body of slag 100 collected in the bottom of the auxiliary furnace promotes combustion of the fuel and assists in the ignition of the fuel following a temporary shut down in the operation of the burner 50. Under normal operation, this pool of collected slag is maintained so that its top surface is preferably between the burner 50 and the top of the opening 76 through which the slag is drained.

Freezing of slag across the flue 24 is prevented by the passage of gases from the auxiliary furnace. A permanent outflow of slag from the main furnace is thus assured.

The illustrative arrangement promotes desirable structural and thermal characteristics of the installation by reason of the relatively small auxiliary furnace permitted. A cumbersome slag pit construction is avoided.

After being superheated by the heat developed in the slag pit auxiliary furnace, the steam proceeds through branches 78 and 80 to a steam line 82 delivering it to a point of use.

The boiler installation is shown as provided with three gas passes, indicated by the numerals 84, 86, and 88. These passes are formed by baffles 90 and 92 crossing the tube bank 94 of a water tube boiler section having uptake headers 96 and downtake headers 98.

The superheater tubes are not exposed to hot furnace gases until sufficient steam is generated by the boiler and passed through the tubes to protect them. This may be accomplished by postponement of the operation of the burners of the auxiliary furnace. After steam is flowing through the superheater tubes in sufficient quantity, regulation of the superheat is effected without varying the combustion of the main furnace for that purpose.

Connection of the inlet 62 directly to drum 72 permits the two superheaters to operate independently, or in unison when connected in parallel.

Fig. 1 discloses a saturated steam conduit 116 connected with a conduit 62 by means of a T 120 at one side of the furnace. The valve 118 is provided for controlling the flow of saturated steam to this conduit. The valve 114 is similarly positioned in the conduit 70. The superheated steam line 82 is connected to the conduit 62 by means of a line 126 in which there is interposed a valve 124. In the conduit 62 there is placed a valve 122. When the superheaters 88 and 49 are to be connected in parallel the valves 114 and 118 are both open and the valve 122 is closed. Saturated steam then proceeds from the drum 72 to the superheater. Part of it goes through the line 70 and another part through the line 116. The valve 124 is open so that superheated steam may pass from the superheater 88 directly to the steam line 82 where it joins steam proceeding from the superheater 48. When the superheaters are to be operated in a series arrangement, the valves 118 and 124 are closed and the remaining valves in the steam lines are open.

Figs. 2 and 3 of the drawings illustrate an auxiliary furnace 102 located below the main furnace 104 and positioned in proximity to the burner 57. This arrangement, in addition to causing the turbulence in gas mixing above described, causes adequate draft for the auxiliary furnace to be induced by the combustion currents of the main furnace.

In the illustrative structure of Fig. 2 combustion currents flowing from the burner 16 moves transversely into the combustion currents moving from the burner 57. When different fuels are used in these two burners, the consequent thorough mixing and turbulence promotes effective combustion in the furnace. With the arrangement shown in Fig. 2, the proximity of the flue 24 to the burner 57 imparts to the burner 57 a function whereby it adds to the control of slag chilling upon that wall of the flue which receives the greater slag flow. Disparity of the slag flow on the opposite walls of the flue caused by the disparity in the slag inclines 106 and 108 thus receives compensation.

As in the structure illustrated in Fig. 1 of the drawings, the Fig. 2 structure can maintain a body of slag 110 collected as a pool in the bottom of the auxiliary furnace. The sweeping of the combustion materials from the burner 112 for a considerable distance over the surface of the slag pool as indicated in Fig. 3 of the drawings, increases the action whereby the slag is maintained in a molten and flowable condition and promotes quick starting of the combustion in the auxiliary furnace after a temporary shut down in the operation of the burner 112.

While the invention has been described with particular reference to the structure shown in the drawings, it is to be appreciated that it is not limited thereto but is of a scope commensurate with the scope of the sub-joined claims.

What is claimed is:

1. In power steam generating equipment, a boiler section, a first furnace from which combustion gases pass to said boiler section and deliver heat thereto, water walls for said first furnace, means for burning pulverized coal in said furnace, an inclined water cooled floor for said first furnace, extended portions of said floor constituting an outlet for slag flowing from said furnace, a second separately fired furnace located below said outlet to receive slag flowing from the first furnace, a wall of said second furnace formed with a slag tap outlet, means for directing burning fuel into the second furnace so as to maintain the collected slag in molten condition, a radiant type steam superheater having heat exchange elements exposed to the radiant heat transmitted from the burning fuel in said second furnace, a convection type steam superheater receiving heat from the combustion gases of said first furnace, and connections whereby steam passes in series from said boiler section through the convection type superheater and thence through the radiant type superheater to a point of use, a slag outlet for said first furnace constituting a flue whereby the combustion gases pass from the second furnace to the first furnace.

2. In power steam supply equipment, a boiler section, a main boiler furnace, means projecting through a wall of the furnace for burning pulverized fuel therein, means at the base of the furnace forming an outlet through which slag flows therefrom, a second furnace adjacent the base of the main furnace and separately fired so as to maintain slag flowing from the first furnace in a molten condition, and a radiant type steam superheater associated with the second furnace so as to receive heat radiantly transmitted from the burning fuel therein.

3. In a power steam supply system, a plurality of separately fired furnaces, a boiler section and a convection type steam superheater in position to contact with the combustion gases passing through said furnaces, means for burning powdered coal in one of the furnaces, means for directing molten slag deposited in the coal burning furnace to the other furnace, a radiantly heated steam superheater in the other furnace, means for burning fuel in the other furnace, so as to maintain the collected slag in molten condition, and connections whereby steam generated by the boiler passes first through the convection superheater and then through the radiantly heated superheater to a point of use.

4. In a steam system, a plurality of independently fired furnaces, an inclined water cooled floor for the first of said furnaces, a slag drain opening at the base of the incline formed by said floor, the second of said furnaces arranged to receive and collect molten slag flowing through said opening, a convection type steam superheater heated by the first furnace, and a radiant heat type of steam superheater in a wall of the second furnace.

5. In a power steam supply system, a boiler section, a main furnace from which combustion gases pass to heat the boiler section, means for burning pulverized fuel in the main furnace, means for directing to an outlet the molten slag deposited from the burning fuel in the main furnace, an auxiliary separately fired furnace receiving and collecting the slag flowing through said outlet, means for burning fuel in the auxiliary furnace so as to keep said collected slag in molten condition, means permitting the tapping of the auxiliary furnace to allow the collected slag to run off, means for joining the combustion gases from both furnaces, a convection type steam superheater, means for directing the combustion gases from the main furnace over said superheater, a radiant heat type of steam superheater receiving steam from the convection superheater, and means for conducting steam from the radiant superheater to a point of use, the radiant superheater having heat exchange parts receiving heat radiantly transmitted from the burning fuel in the auxiliary furnace.

6. In a device of the character described, a water wall boiler furnace of large combustion volume, and an auxiliary furnace located beneath and toward one side of the main furnace, opposite water tube walls forming the roof of the auxiliary furnace and sloping bottom walls of the main furnace, a water tube flue for the auxiliary furnace formed by intermediate portions of the walls constituting the roof of the auxiliary furnace and bottom of the main furnace, a burner for the auxiliary furnace projecting combustion currents along the surface of a pool of slag collecting in the bottom of that furnace, a burner for the main furnace projecting combustion currents into that furnace at a position adjacent said flue and a second burner for the main furnace projecting combustion currents transversely of the currents projected by the second mentioned burner.

7. In combination, a main furnace, an auxiliary furnace receiving molten incombustibles draining from the main furnace, walls forming a throat connecting the furnaces and permitting products of combustion to pass from the auxiliary furnace to the main furnace, a first main furnace burner directing flame toward the throat, a second main furnace burner directing its flame transversely of the flame of the first burner and toward and across the throat, an auxiliary furnace burner directing flame downwardly toward the bottom of the auxiliary furnace to maintain a slag pool, and means providing for periodically tapping slag from the pool in the secondary furnace.

8. In combination, a furnace having walls including spaced tubes connected into fluid circulation, means forming a slag pit below the furnace, spaced water tubes included in a furnace floor inclined downwardly toward a long narrow slag discharge slot communicating with the slag pit and the furnace, means for burning a slag forming fuel, said slot being arranged relative to the burner so that flames from the burner play upon a wall of the slot to prevent bridging of slag across the slot.

9. In a fluid heat exchange device, a furnace the walls of which include spaced tubes connected into fluid circulation, a furnace floor inclined downwardly toward a long narrow slot constituting a slag discharge opening, spaced floor cooling tubes extending along a wall of the slot, and a burner located in a wall of the furnace facing the floor and said slot and directing the flames of a slag forming fuel directly downwardly toward the slot.

10. In a pressure vapor generator, a main furnace having a free combustion chamber of large volume, groups of parallel fluid cooled tubes defining opposite sides of said chamber with one of said groups being located at the gas outlet side, fuel burning means between said groups of tubes, an auxiliary furnace independently fired and so arranged that its gases pass through one of said sides and transmit heat to said tubes and then pass through the main furnace, a superheater in the auxiliary furnace protected by some of said tubes from excessive heating due to the radiant transmission of heat from the burning fuel in the main furnace, some of said tubes at the side of the combustion chamber opposite its gas outlet side extending in parallelism transversely of the general path of the gases flowing from the auxiliary furnace to the main furnace and absorbing heat from the main furnace as well as the auxiliary furnace, a vapor and liquid separator having said tubes communicating therewith, and connections whereby vapor from the separator passes to the superheater.

11. A steam generator comprising, a main furnace having a heating gas outlet at one side thereof, a bank of steam generating tubes extending across said gas outlet, means for burning fuel in said main furnace, an auxiliary furnace opening to said main furnace at the side of said main furnace opposite said tube bank, a steam superheater in said auxiliary furnace, means for burning fuel in said auxiliary furnace, and means including a group of heat absorbing tubes extending along said opposite side of the main furnace and the adjacent side of said auxiliary furnace and arranged to receive heat from heating gases leaving said auxiliary furnace and to form a screen protecting the superheater from overheating due to absorption of heat radiantly transmitted from the main furnace, the tubes of said group being also arranged to form a restricted gas outlet through which the gases from the auxiliary furnace pass into the main furnace and thence over the tubes of said bank.

12. In a steam boiler, a main furnace including fuel burning means, inclined steam generating tubes connected into the boiler circulation and extending across the path of the furnace gases at the gas outlet side of the furnace, spaced tubes connected into the boiler circulation and delineating the side of the main furnace opposite its gas outlet side, and an auxiliary furnace from which the furnace gases pass between the last mentioned tubes into the main furnace, means for burning fuel in the auxiliary furnace, and a superheater exposed to the heat of the auxiliary furnace, the last mentioned tubes shielding the superheater from radiant heat from the main furnace and the fuel burning means of the main furnace being located at a position intermediate the first mentioned tubes and the second mentioned tubes.

13. In a furnace burning a slag forming fuel, walls forming a combustion chamber, a furnace bottom sloping downwardly toward a long narrow slag discharge throat, and forming a wall of the throat, spaced wall cooling tubes extending along the furnace bottom and the wall of the throat so as to maintain a coating of frozen slag along said throat wall and thereby prevent damage to the wall by overheating, and a burner projecting flames downwardly toward said throat to prevent the freezing of slag thereacross and to maintain slag flow from the furnace.

14. In a fluid heat exchange device, a furnace the walls of which include spaced tubes connected into fluid circulation, a furnace floor inclined downwardly toward a long narrow slot constituting a slag discharge opening, spaced floor cooling tubes extending along a wall of the slot, and a burner located in a wall of the furnace and directing the flames of a slag forming fuel so that they pass downwardly and toward the slot, the location of said burner with relation to said inclined furnace floor being such that a portion of the slag accumulating thereon is maintained in a molten condition to cause the same to flow along the inclined furnace floor and through the slag discharge opening.

15. A steam generator including fluid cooled walls defining a combustion chamber, means for burning a slag forming fuel in the combustion chamber, a bank of steam generating tubes extending across the gas outlet of said chamber, a fluid cooled floor portion inclined at an angle less than 45 degrees to the horizontal and discharging slag through a narrow transverse slot in the floor of the furnace, the slot being bounded on both sides by a water cooled surface and establishing communication between said chamber and a slag pit, and said fuel burning means directing a stream of burning slag forming fuel downwardly into the combustion chamber and against said horizontally inclined floor portion in a direction such that a portion of the slag accumulating thereon is maintained in molten condition to cause the same to flow along the inclined furnace floor and through the narrow transverse slot to the slag pit.

LEWIS W. HELLER.